(12) United States Patent  (10) Patent No.: US 7,553,228 B2
Dillon                    (45) Date of Patent:     Jun. 30, 2009

(54) GRAIN HANDLING ASSEMBLY FOR COMBINE WITH POWERED AND STEERABLE GRAIN TRAILER

(76) Inventor: Ben N. Dillon, 7311 Falls View Cir., Delaware, OH (US) 43015

( * ) Notice: Subject to any disclaimer, the term of this patent is extended or adjusted under 35 U.S.C. 154(b) by 268 days.

(21) Appl. No.: 11/475,359

(22) Filed: Jun. 27, 2006

(65) Prior Publication Data

US 2007/0298852 A1    Dec. 27, 2007

(51) Int. Cl.
*A01F 12/46* (2006.01)
*A01D 34/00* (2006.01)

(52) U.S. Cl. ............ 460/114; 460/119; 56/14.6

(58) Field of Classification Search ........ 460/114, 460/115, 119; 414/502; 56/14.6
See application file for complete search history.

(56) References Cited

U.S. PATENT DOCUMENTS 3,690,016 A * 9/1972 Walhof et al. ............. 34/174
6,125,618 A * 10/2000 Dillon ...................... 56/14.6
6,910,845 B2 * 6/2005 Dillon ...................... 414/502

* cited by examiner

*Primary Examiner*—Alicia M Torres
(74) *Attorney, Agent, or Firm*—Mueller Smith & Okuley

(57) ABSTRACT

A combination of a powered combine carrying a combine grain bin for housing harvested grain and a towed grain cart carrying a grain cart bin for housing harvested grain includes harvested grain transfer between the combine grain bin and the grain cart bin and improved off-loading of harvested grain from the combination. A generally horizontally disposed first grain movement assembly is pivotally connected to a second grain movement assembly, which in turn is pivotally connected to a vertically disposed grain movement assembly in the grain cart, such that the rear end of the second grain movement assembly moves in all horizontal directions, but not in the vertical direction. The first grain movement assembly has an arcuate trolley ahead of the pivoted joint with the second grain movement assembly. An off-loading grain movement assembly is disposed for off-loading grain only from the combine grain bin.

10 Claims, 6 Drawing Sheets

GRAIN HANDLING ASSEMBLY FOR COMBINE WITH POWERED AND STEERABLE GRAIN TRAILER

CROSS-REFERENCE TO RELATED APPLICATIONS

None

STATEMENT REGARDING FEDERALLY SPONSORED RESEARCH

Not applicable.

BACKGROUND OF THE INVENTION

The present invention generally relates to combines that pull an integrated powered and steerable grain trailer for extra storage capacity, and more particularly to a grain handling assembly therefor.

A much-improved grain handling assembly is disclosed in U.S. Pat. No. 6,910,845 (the '845 patent), the disclosure of which is expressly incorporated herein by reference. The '845 patent discloses a generally horizontally disposed first grain movement assembly pivotally connected within the combine grain bin and pivotally connected within the grain cart bin and disposed for reciprocally transporting grain between the combine grain bin and the grain cart bin. A generally vertically disposed second grain movement assembly is cooperatively operable with the first grain movement assembly for transferring grain from the grain cart bin to the first grain movement assembly and thence to the combine grain bin. An off-loading grain movement assembly is disposed for off-loading grain only from the combine grain cart.

While the '845 patent concept is a fine advancement in the art, it was quite unexpectedly discovered that when the combine's wheels dipped down into an 18 inch depression in the field, that the geometry of the grain movement assembly resulted in the grain cart end of the horizontal conveyor assembly moving vertically around 5 feet. The design in the '845 patent does not accommodate such a large vertical displacement of the horizontal grain conveyor; hence, the present improvement to the '845 grain conveyor system.

BRIEF SUMMARY OF THE INVENTION

An improved combination of a powered combine and a grain cart towed with the combine. The combine carries an on-board combine grain bin for housing harvested grain and the grain cart carries a grain cart bin for housing harvested grain. The combine has a rear adjacent to the grain cart. The improvement is for transferring harvested grain between the combine grain bin and the grain cart bin and for off-loading harvested grain from the combination includes a generally horizontally disposed first grain movement assembly connected within the combine grain bin and pivotally connected by a first joint assembly to a second grain movement assembly at the rear of the combine. The first and second grain movement assemblies are disposed for reciprocally transporting grain between the combine grain bin and the grain cart bin. The combine carries an arcuate trolley ahead of the first assembly joint. The trolley carries the first grain movement assembly and permits it to move across the width of the combine.

A generally vertically disposed second grain movement assembly is cooperatively operable with the second grain movement assembly for transferring grain from the grain cart bin to the second grain movement assembly and thence to the combine grain bin via the first grain movement assembly. The second grain movement assembly is fixed to the vertical grain movement assembly with a second joint assembly permitting movement of the second grain movement assembly in all horizontal directions but not in the vertical direction. An off-loading grain movement assembly is disposed for off-loading grain only from the combine grain bin.

Advantages of the present invention include a single grain unloading assembly for both the combine grain bin and the grain cart bin. Such single grain unloading assembly eliminates the possibility of collision between separate unloading assemblies for each grain bin. A further advantage is that unloading is facilitated by only having to position one unloading assembly adjacent to a truck during off-loading. Another advantage is the ability of the horizontal grain conveyor to accommodate large vertical movement caused by the combine wheels moving downwardly in field depressions. These and other advantages will be readily apparent to those skilled in the art based on the disclosure set forth herein.

BRIEF DESCRIPTION OF THE DRAWINGS

For a fuller understanding of the nature and advantages of the present invention, reference should be had to the following detailed description taken in connection with the accompanying drawings, in which.

The drawings will be described in detail below.

DETAILED DESCRIPTION OF THE INVENTION

The present invention improves upon the grain cart and combine combination disclosed in the '845 patent, which is an improvement on U.S. Pat. No. 5,904,365 (the '365 patent), which unloads harvested grain from both the onboard combine grain bin and the grain cart bin towed by the combine. Accordingly, a "towed" grain cart for present purposes comprehends a grain cart that simply is towed (having no ability to steer and not powered), is steerable only, is powered only, or is both powered and steerable. Much of the detail of the combination (combine and towed grain cart) is detailed in the '365 and '845 patents and, thus, will not be described in detail herein. Rather, the following disclosure focuses on the intermediate pivot joint in the horizontal conveyor and the interconnection of the horizontal conveyor with the grain cart vertical conveyor.

Figure 1:
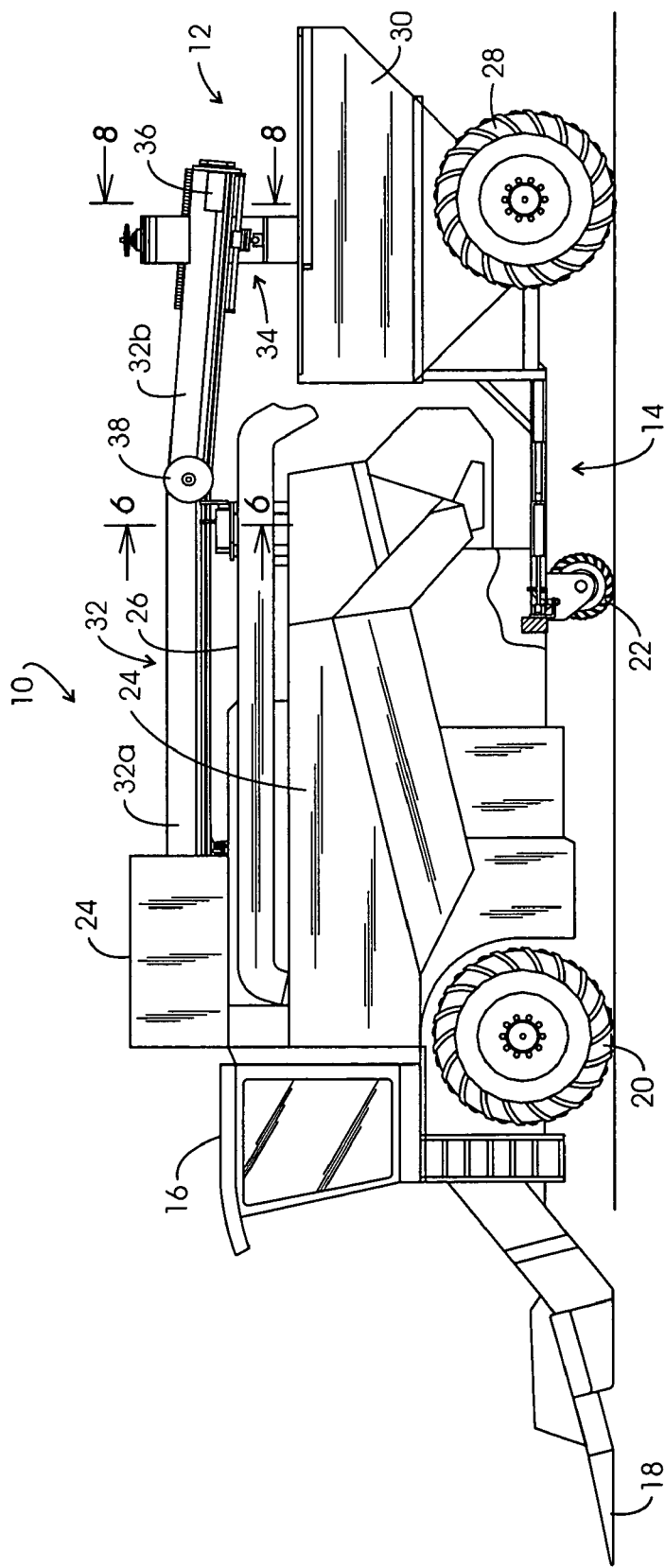
FIG. 1 is a side elevational view of the novel combination of combine (or harvester) and towed grain cart.

Referring initially to FIG. 1, a combine, 10, is seen towing a grain cart, 12, which are mechanically interconnected by a tongue assembly, 14. Combine 10 generally includes a cab, 16, in which the operator is seated, a cornhead, 18, a drive wheel pair, 20 (only one of each set of wheels being depicted in FIG. 1), a steering wheel pair, 22 (only one of each set of wheels being depicted in FIG. 1), a primary grain hopper or combine grain bin, 24, and an auger assembly, 26, for unloading hopper 24. Such combine is a modern combine with all of the appurtenances and features that combine manufacturers provide today. Similarly, grain cart 12 is conventional in construction in that it includes a wheel pair, 28 (see FIG. 2 to view both wheel pairs 28a and 28b), a secondary grain hopper or grain cart bin, 30, and tongue 14.

It will be observed that a generally horizontal first grain transfer assembly, 32, runs between combine grain bin 24 and grain cart bin 30, and is composed of a front grain assembly, 32a, and a rear grain assembly, 32b. A generally vertical grain transfer assembly, 34, is seen to be located within grain cart bin 30 and is interconnected with first grain transfer assembly 32. Horizontal grain transfer assembly 32 is seen to extend into combine grain bin 24 through its rear wall and vertically at about its midpoint. A canvas, rubber, or other suitable material seal, 33, keeps the harvested grain from spilling out, yet permits movement of assembly 32 during turning of the combine. This location means that as soon as combine grain bin 24 is about one-half full, harvested grain housed in bin 24 can be withdrawn and transferred into grain cart bin 30. Conversely, by reversing the direction of travel of transfer assembly 32 grain can be transferred from grain cart bin 30 back into combine grain bin 24 for its unloading via unloading mechanism 26.

While the grain transfer assemblies can be conveyors, augers, or similar known devices (e.g., auger, bucket conveyor, cleated conveyor, or the like), the present invention will be specifically illustrated with (and not limited to) auger assemblies. Generally, a hydraulic motor assembly, 36, powers horizontal harvested grain transfer rear assembly (auger) 32b and front grain transfer assembly 32a, and is composed of a suitably sized hydraulic motor, chain, sprocket, and bearings. A joint assembly, 38, connects front or first auger assembly 32a and second or rear auger assembly 32b. An assembly, 40, interconnects or fixes rear auger assembly 32b to vertical auger assembly 34.

Figure 3:
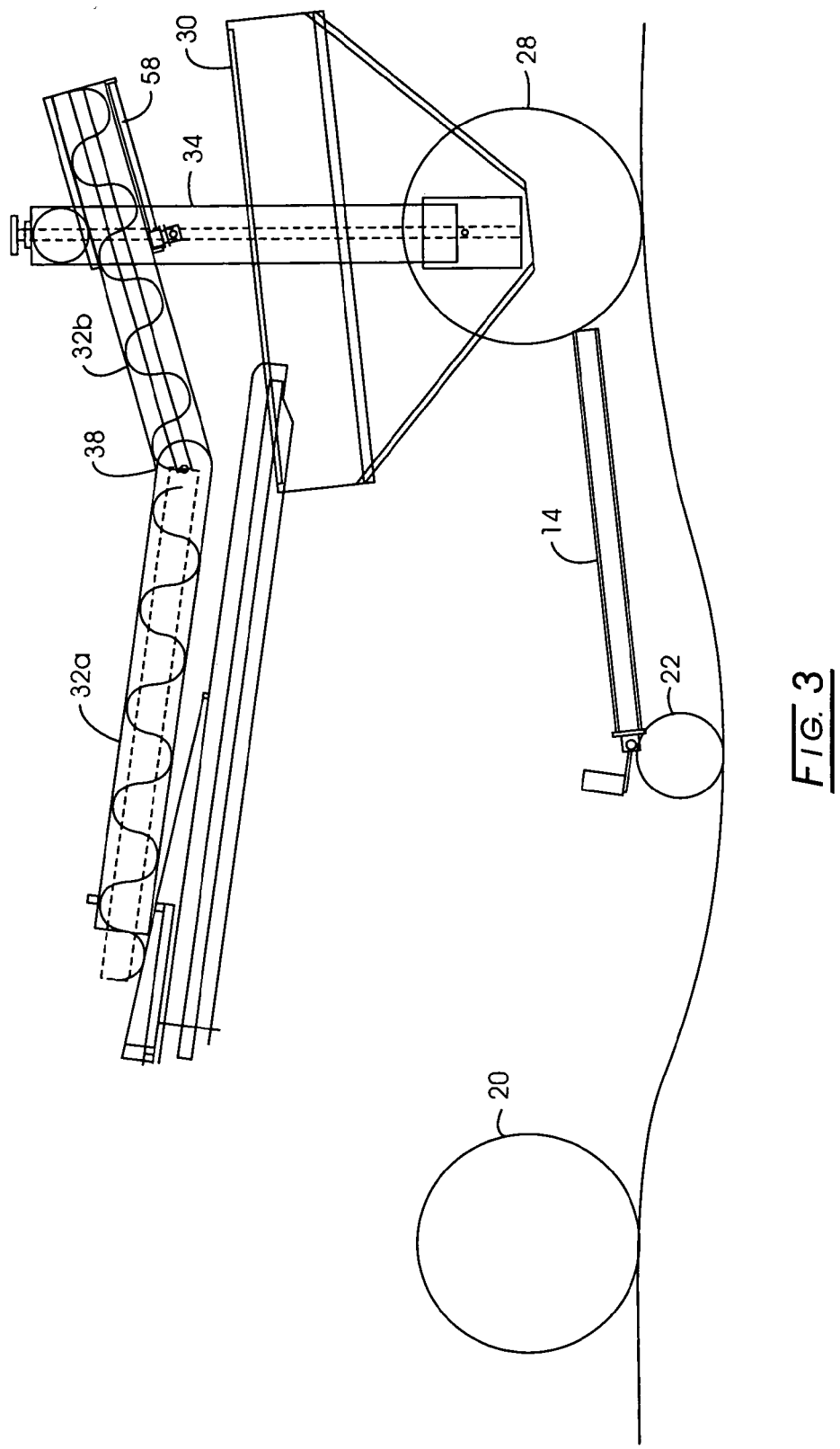
FIG. 3 is side elevational view of the novel combination showing the conveyor movement necessary to accommodate the harvester's rear wheels moving through a depression in the field during harvesting operations.
Figure 4:
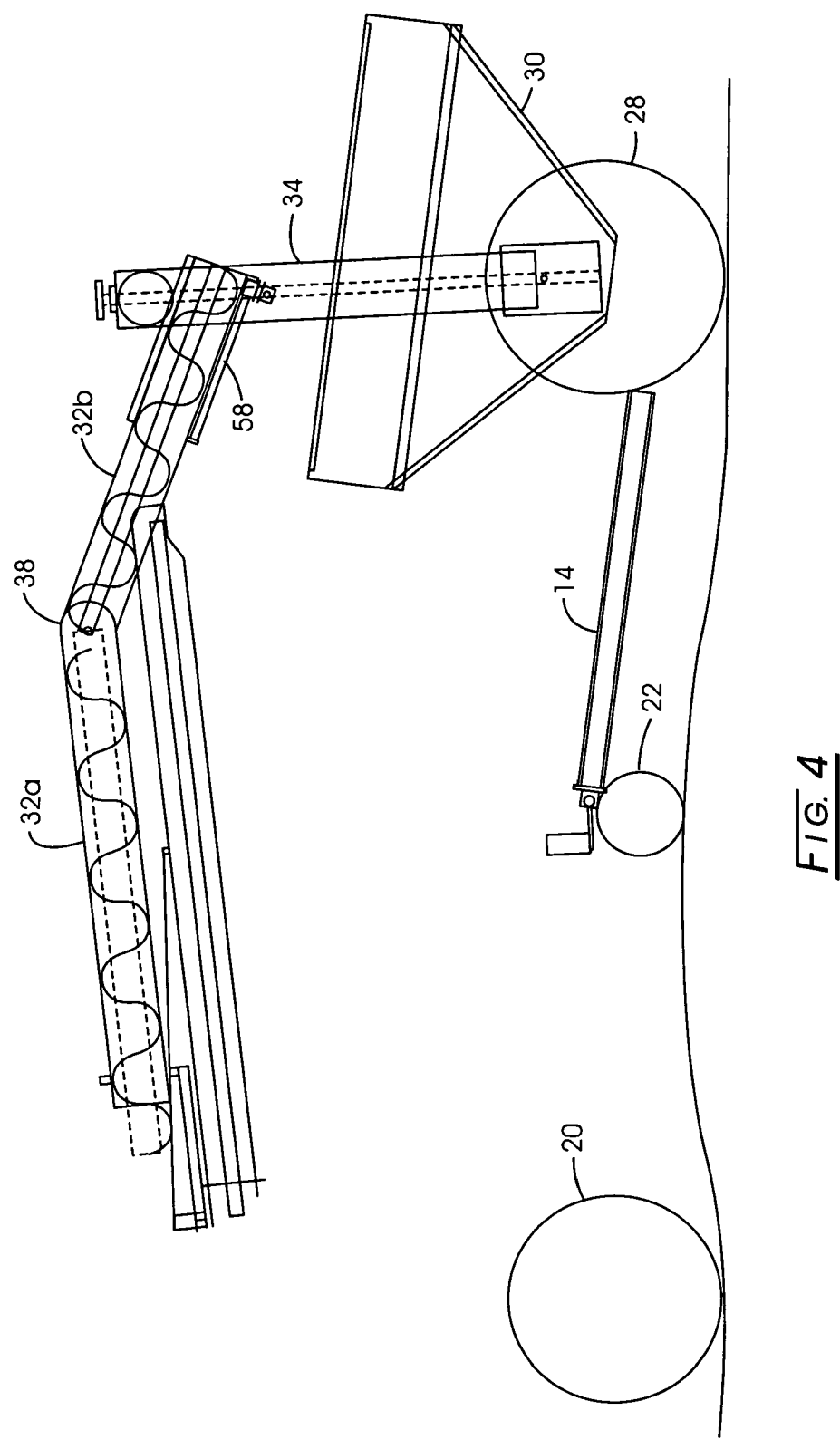
FIG. 4 is side elevational view of the novel combination showing the conveyor movement necessary to accommodate the harvester's front wheels moving through a depression in the field during harvesting operations.

The reason for jointed auger assembly 32 and the unique jointed connection of auger assembly 32 to vertical auger assembly 34 can be seen in FIGS. 3 and 4. When rear wheel pair 22 of combine 10 goes down a merely 18 inches, for example, into a depression in the field as illustrated in FIG. 3, tongue 14 similarly is displaced vertically 18 inches or about 6.5° relative to grain cart 30. Such wheel movement, however, results in auger assembly 32a moving downwardly about 7° from the horizontal and auger assembly 32b moving about 15.5° upwardly from the horizontal, both auger assembly movements being about joint assembly 38. With the dimensions of a typical commercial harvester and without joint assembly 38, the rear end of auger assembly 32b would move vertically about 5 feet. The need for joint assembly 38, thus, can be realized.

When rear wheel assembly 22 of combine 10 goes up a merely 18 inches, for example, atop a small hill in the field as illustrated in FIG. 4, tongue 14 similarly is displaced vertically 18 inches or about 6.5° relative to grain cart 30. Auger assembly 32a, then, is displaced upwardly about 7° and rear auger assembly 32b is displaced downwardly about 17.3°. Vertical auger assembly 34 is displaced to an angle of about 83° also. Again, the movement of the rear end of rear auger assembly 32b would be about 5 feet or so. Again, the need for joint assembly 38 is demonstrated. Though, perhaps, not readily apparent, the movement of the rear end of rear auger assembly 32b also places a demand on the interconnection between it and vertical auger assembly 34, as will be described in detail below.

Figure 5:
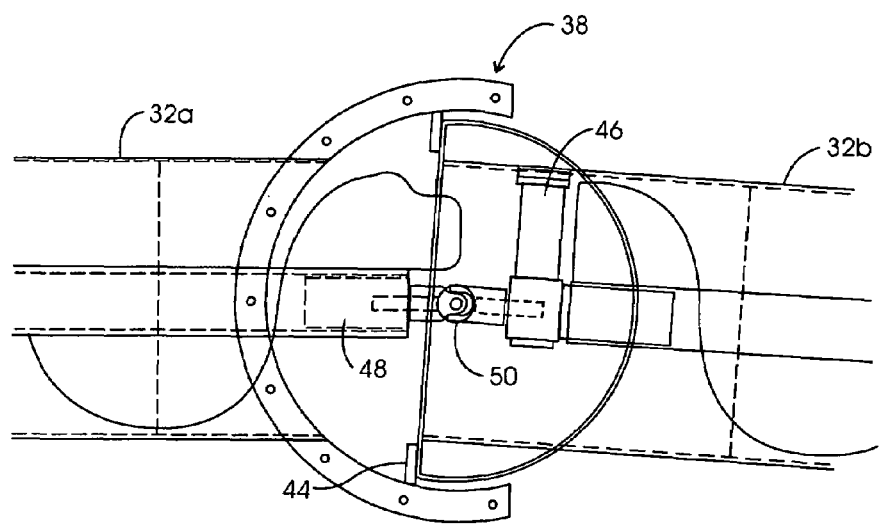
FIG. 5 is a sectional view taken along line 5-5 of FIG. 2.

Referring now to FIG. 5, auger assembly 32a at its rear end terminates with a hemispherically shaped element, 40, that surmounts a similar element, 42, that terminates on the forward (or front) end of auger assembly 32b, and along with a seal, 44, keeps the grain confined within the auger assemblies. A hanger bearing assembly, 46, retains the end of the auger in auger assembly 32b and permits it to rotate, while the rear end of the auger of auger assembly 32a is stationarily held by a bearing assembly, 48. A joint assembly, such as, for example, a universal joint, 50, interconnects the two augers and transfers power (rotation) from motor assembly 36 from the rear auger assembly to the front auger assembly, regardless of the direction of rotation.

Figure 2:
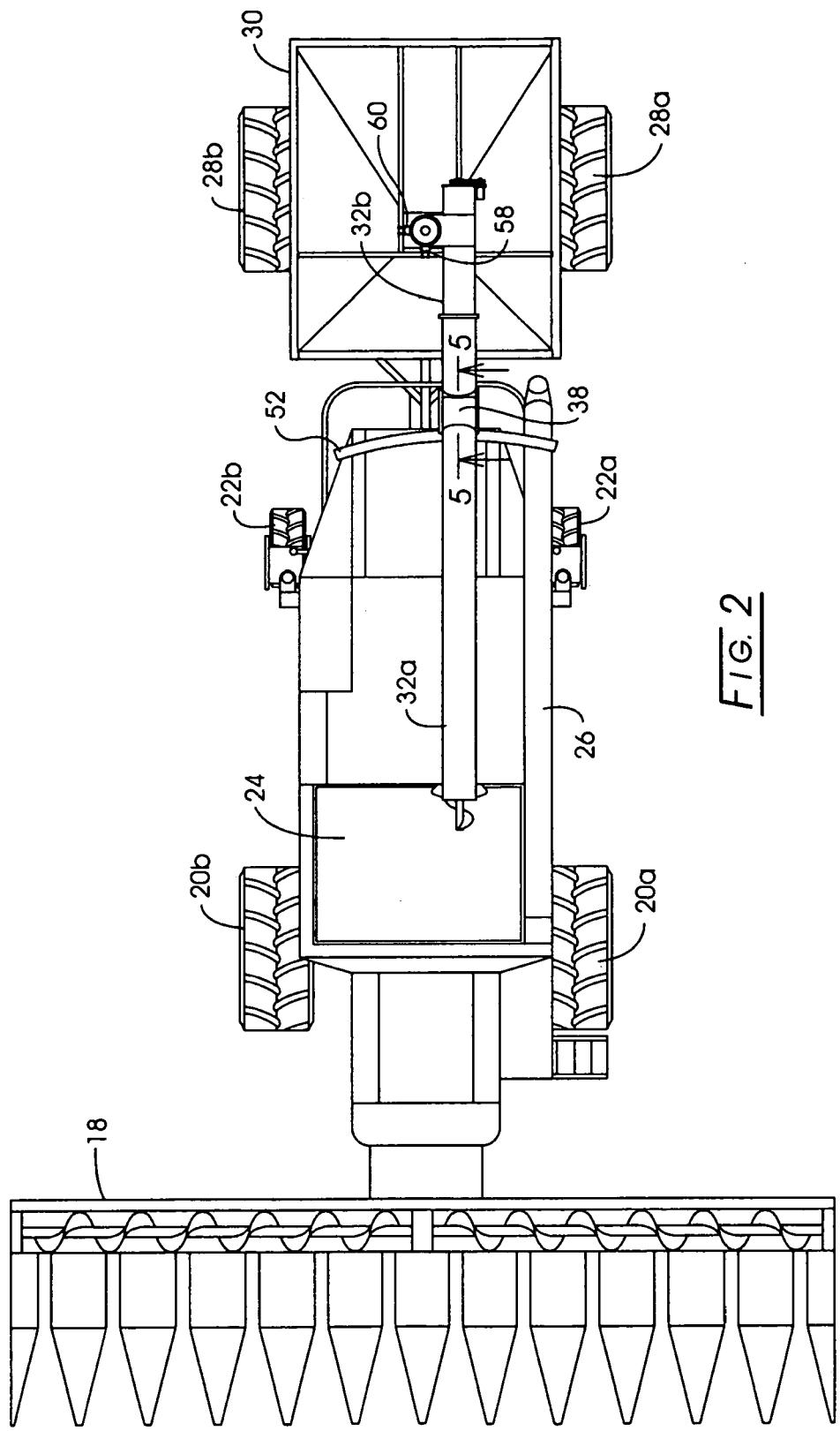
FIG. 2 is an overhead view of the novel combination illustrated in FIG. 1.
Figure 6:
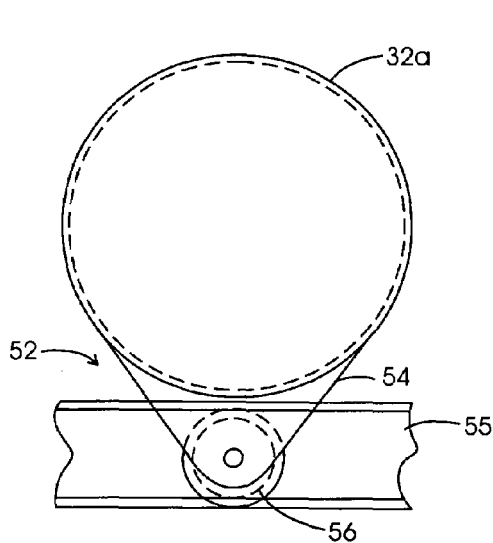
FIG. 6 is a sectional view taken along line 6-6 of FIG. 1.
Figure 7:
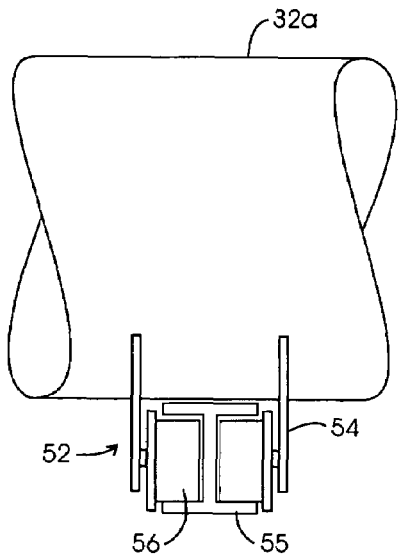
FIG. 7 is an end view of the trolley (i.e., end view of FIG. 6)

Joint assembly 38 is located rearwardly of a trolley assembly, 52 (formed of a rail, cradle, and wheel assembly) that spans across combine 10 towards its rear (see FIG. 2, for example). In FIGS. 6 and 7, auger assembly 32a is seen to ride atop a rail, 55, of trolley assembly 52 by a cradle, 54, which is connected to a wheel pair assembly, 56, that rides rail 55 of trolley assembly 52. As combine 10 turns relative to grain cart 30, auger assembly 32a moves in an arcuate path carried by trolley assembly 52. Trolley assembly 52 is located ahead or forward of joint assembly 38 in order to permit rear auger assembly 32b to move vertically up and down, such as occurs when combine 10 traverses over uneven ground (see description of FIGS. 3 and 4, above).

Figure 8:
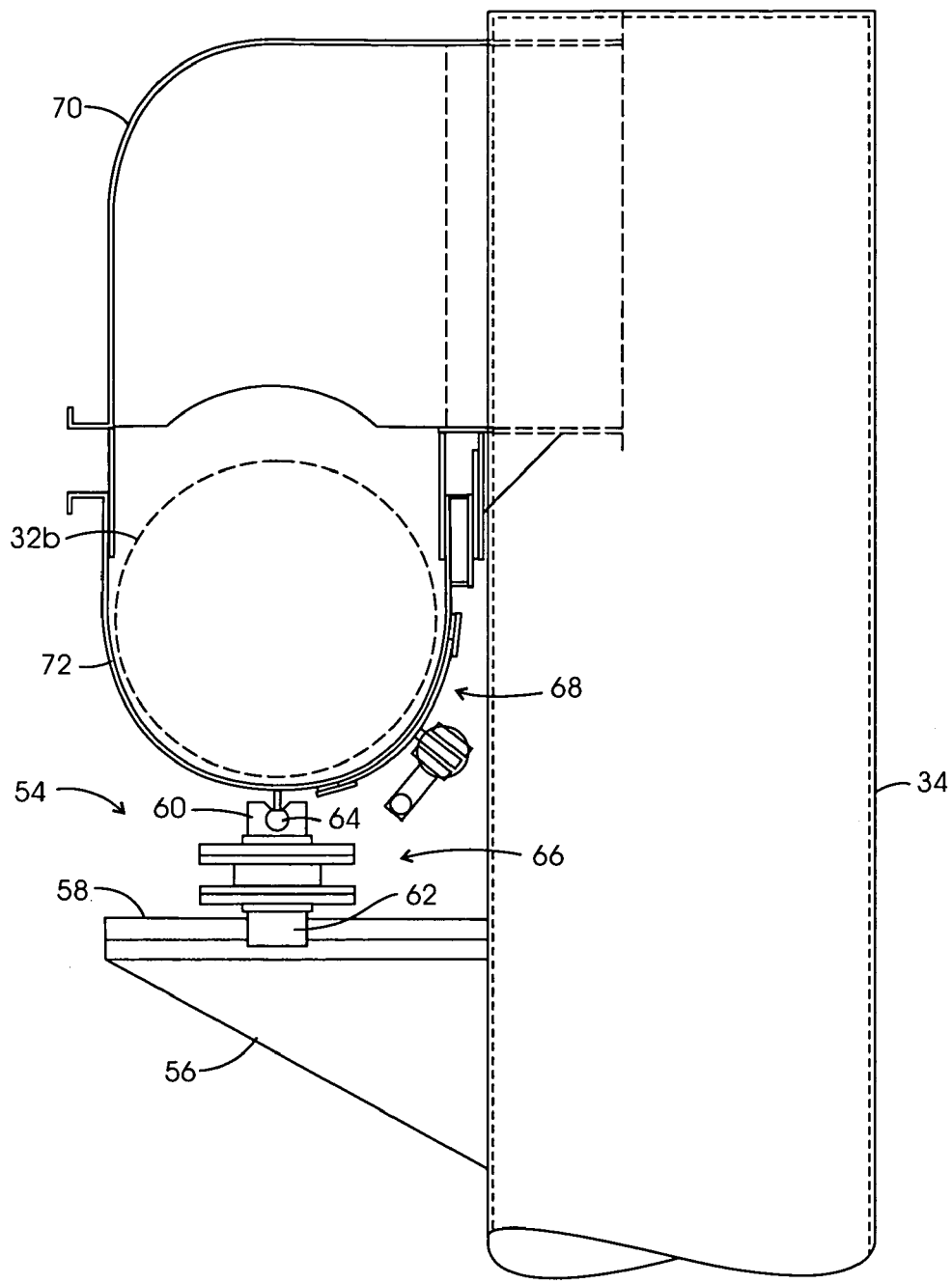
FIG. 8 is a sectional view taken along line 8-8 of FIG. 1

Referring now to FIG. 8, a support assembly, 54, for auger assembly 32b and for its connection to vertical auger assembly 34 is illustrated. A support bracket assembly, 56, connected to vertical auger assembly 34 carries auger assembly 32b and forms the base of support assembly 54. A pair of rails, 56 (see also FIGS. 2, 3 and 4) and 58 (see also FIG. 2), sit atop bracket assembly 56. Linear bearing assemblies, 62 and 64, ride along rails 56 and 60, respectively, to provide X-Y coordinate movement to auger assembly 32b, such as is required in connection with combine 10 moving over uneven ground in the field (see description in connection with FIGS. 3 and 4, above). Because auger assembly 32b will rotate also with respect to vertical auger assembly 34, a turntable assembly with rotation bearing, 66, is interposed between rails 56 and 60. The combination of rails and turntable enable vertical auger assembly 34 to move in virtually any horizontal direction; however and importantly, such combination of rails and turntable are fixed in the vertical direction, permitting no vertical movement of the rear end of auger assembly 32b at its location adjacent to vertical auger assembly 34. Instead, joint assembly 38 supplies the required vertical movement.

A door assembly, 68, permits grain being moved by auger assembly 32b to be dumped into grain cart 30. An overhead elbow, 70, allowed grain to flow from grain cart 30 up through vertical auger assembly 34 and into auger assembly 32b for transport eventually into combine grain bin 24 via auger assembly 32a, as is described in greater detail in the '845 patent. An accordion-like U-bracket assembly, 72, retains auger assembly 32b and expands/contracts as needed. Various seals and other components are provided in conventional fashion as are necessary, desirable, or convenient.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. An improved combination of a powered combine and a grain cart towed with said combine, said combine carrying an on-board combine grain bin for housing harvested grain and said grain cart carrying a grain cart bin for housing harvested grain, said combine having a rear adjacent to said grain cart, the improvement for transferring harvested grain between said combine grain bin and said grain cart bin and for off-loading harvested grain from said combination, which comprises:
   (a) a generally horizontally disposed first grain movement assembly connected within said combine grain bin and pivotally connected by a first joint assembly to a second grain movement assembly at the rear of said combine, said first and second grain movement assemblies disposed for reciprocally transporting grain between said combine grain bin and said grain cart bin;
   (b) said combine carrying an arcuate trolley ahead of said first joint assembly, said trolley carrying said first grain movement assembly and permitting it to move across the width of said combine;
   (c) a generally vertically disposed grain movement assembly cooperatively operable with said second grain movement assembly for transferring grain from said grain cart bin to said second grain movement assembly and thence to said combine grain bin via said first grain movement assembly;
   (d) said second grain movement assembly being affixed to said vertical grain movement assembly with a second joint assembly permitting movement of said second grain movement assembly in all horizontal directions but not in the vertical direction; and
   (e) an off-loading grain movement assembly disposed for off-loading grain only from said combine grain bin.

2. The combination of claim 1, wherein all of said grain movement assemblies comprise auger assemblies.

3. The combination of claim 2, wherein said first grain movement auger is rotationally connected with a universal joint to said second grain movement auger.

4. The combination of claim 1, wherein said second joint assembly comprises a pair of orthogonally disposed rail and linear bearing assemblies, and a rotational turntable.

5. The combination of claim 1, wherein said towed grain cart is one or more of non-powered and non-steerable, steerable, powered, or powered and steerable.

6. A method for transferring harvested grain between a combine grain bin and a grain cart bin and for off-loading harvested grain from a combination of a powered combine and a grain cart towed with said combine, said combine carrying said on-board combine grain bin for housing harvested grain and said grain cart carrying said grain cart bin for housing harvested grain, which comprises:
   (a) providing a generally horizontally disposed first grain movement assembly connected within said combine grain bin and pivotally connected by a first joint assembly to a second grain movement assembly at the rear of said combine, said first and second grain movement assemblies disposed for reciprocally transporting grain between said combine grain bin and said grain cart bin; said combine carrying an arcuate trolley ahead of said first assembly joint, said trolley carrying said first grain movement assembly and permitting it to move across the width of said combine;
   (b) providing a generally vertically disposed grain movement assembly cooperatively operable with said second grain movement assembly for transferring grain from said grain cart bin to said second grain movement assembly and thence to said combine grain bin via said first grain movement assembly; said second grain movement assembly being affixed to said vertical grain movement assembly with a second joint assembly permitting movement of said second grain movement assembly in all horizontal directions but not in the vertical direction;
   (c) loading said combine grain bin with harvested grain;
   (d) when required, transferring harvested grain from said combine to said grain cart bin using said first and second grain movement assemblies;
   (e) when required, transferring harvested grain from said grain cart bin to said combine grain bin using said vertically disposed grain movement assembly and said first and second grain movement assemblies; and
   (f) when required, off-loading harvested grain only from said combine grain bin with said off-loading grain movement assembly.

7. The method of claim 6, wherein all of said grain movement assemblies provided comprises auger assemblies.

8. The method of claim 7, wherein said first grain movement auger is rotationally connected with a universal joint to said second grain movement auger.

9. The method of claim 6, wherein said second joint assembly comprises a pair of orthogonally disposed rail and linear bearing assemblies, and a rotational turntable.

10. The method of claim 7, wherein said towed grain cart is one or more of non-powered and non-steerable, steerable, powered.

* * * * *